(12) United States Patent
Quan et al.

(10) Patent No.: US 7,835,644 B2
(45) Date of Patent: Nov. 16, 2010

(54) SYSTEM FOR INTERCEPTING SIGNALS TO BE TRANSMITTED OVER A FIBER OPTIC NETWORK AND ASSOCIATED METHOD

(75) Inventors: Robert A. Quan, Hicksville, NY (US); James C. Jones, Silver Spring, MD (US); Karen J. Jackson, Silver Spring, MD (US); Dagmar D. Mayor, Bel Air, MD (US); Rosa M. Underwood, Washington, DC (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 845 days.

(21) Appl. No.: 11/615,444

(22) Filed: Dec. 22, 2006

(65) Prior Publication Data

US 2008/0152343 A1 Jun. 26, 2008

(51) Int. Cl.
*H04J 14/00* (2006.01)
(52) U.S. Cl. .............................. 398/40; 398/45; 398/66; 398/69; 398/70; 398/71; 379/35
(58) Field of Classification Search .................. 398/40, 398/66, 69–71; 379/35
See application file for complete search history.

(56) References Cited

U.S. PATENT DOCUMENTS

| 4,730,312 | A | * | 3/1988 | Johnson et al. | ............. | 370/523 |
| 5,715,293 | A | * | 2/1998 | Mahoney | ..................... | 379/23 |
| 5,859,904 | A | * | 1/1999 | Huang | ........................ | 379/219 |
| 5,940,388 | A | * | 8/1999 | Nahar et al. | ................. | 370/359 |
| 6,044,088 | A | * | 3/2000 | Rahman et al. | ............. | 370/465 |
| 6,078,593 | A | * | 6/2000 | Eames et al. | ................. | 370/498 |
| 6,091,713 | A | * | 7/2000 | Lechleider et al. | .......... | 370/248 |
| 6,185,293 | B1 | * | 2/2001 | Je | .............................. | 379/339 |
| 6,539,027 | B1 | * | 3/2003 | Cambron | .................... | 370/442 |
| 6,552,832 | B1 | * | 4/2003 | Beierle et al. | ................. | 398/74 |
| 7,386,236 | B1 | * | 6/2008 | Kuo et al. | ..................... | 398/99 |
| 2001/0040899 | A1 | * | 11/2001 | Carter et al. | ................. | 370/477 |
| 2002/0135843 | A1 | * | 9/2002 | Gruia | .......................... | 359/167 |
| 2005/0094773 | A1 | * | 5/2005 | Peterson | ..................... | 379/35 |
| 2006/0018322 | A1 | * | 1/2006 | Oron | ........................ | 370/395.1 |
| 2006/0067705 | A1 | * | 3/2006 | Paulsen | ....................... | 398/164 |

OTHER PUBLICATIONS

"Channel bank" Newton's Telecom Dictionary 9th ed 1995.*

* cited by examiner

*Primary Examiner*—Ken N Vanderpuye
*Assistant Examiner*—Tanya Ngo

(57) ABSTRACT

A system is provided for intercepting signals transmitted between a target served by a fiber optic network and a subscriber. A network is described having a phone switch at a central office configured to receive signals for transmission to and from a target, such as the target of a criminal investigation. A signal received at the central office is assigned to an analog circuit, and a monitoring device configured to intercept and monitor the signal is installed along the analog circuit at a location that allows the monitoring of communications without notifying the target that he is under surveillance. After the signal has been monitored, it is converted to a digital signal for transmission. A method is also provided for intercepting a signal transmitted between the target served by a fiber optic network and a subscriber, such that a monitoring device may be installed without alerting the target.

14 Claims, 6 Drawing Sheets

SYSTEM FOR INTERCEPTING SIGNALS TO BE TRANSMITTED OVER A FIBER OPTIC NETWORK AND ASSOCIATED METHOD

BACKGROUND

The needs of law enforcement sometime require access to communications originating from or received by a target, such as an individual suspected of engaging in criminal activity. The communications may take place in various forms, including regular and electronic mail, face-to-face conversations, and communications transmitted over telephone lines, such as telephone conversations and facsimile transmissions. When law enforcement officials are legally authorized to intercept and monitor such communications, for example when a court order authorizing a wiretap on a target's telephone line has been issued, it is important that the officials can gain access to such communications without putting the target on notice that he or she is under surveillance.

In the context of telephone communications, legacy telephone line surveillance devices require an analog access point for lawful intercept monitoring. The monitoring device is typically connected to an analog, or "Tip and Ring," circuit. In the traditional Plain Old Telephone Service (POTS) architecture, telephone service is generally provided by extending a pair of metallic wires, such as copper wires, from a central office to a subscriber's premises. Access points, such as connections provided by cross boxes and local terminals, are typically provided along the circuit between the central office and the subscriber's premises. These access points allow for a monitoring device to be installed in a strategic location along the analog circuit between the central office and a target's premises, such as a location close to the central office where the target would not be aware of the installation or the fact that the target is under surveillance.

Traditional POTS architecture, however, is increasingly being replaced by fiber optic networks, such as Fiber to the Premises (FTTP) architecture, which use fiber optic cable instead of metallic cable to connect a subscriber's premises to the central office and provide telephone service. In a FTTP system, telephonic communications may be digitized and bundled for transmission over the fiber optic cable. In this way, communications received by the central office for transmission to a subscriber, such as communications destined for the target, no longer have a dedicated circuit over which the signals are transmitted. Rather, the digital data bundles are dynamically assigned to communication pathways between the central office and the target's premises. Such dynamic assignment of pathways allows the telephone service provider to use the communications network more efficiently to transmit signals; however, the dynamic assignment also presents obstacles to lawful surveillance of a target's communications as intercepting the signals propagating via one circuit no longer correlates to intercepting only one subscriber's communications.

The replacement of traditional metallic cable with optical fibers has also eliminated the analog access points that are generally required for the installation of lawful intercept monitoring devices. Although the optical fiber extending to the subscriber's premises is generally terminated in an optical network terminal (ONT) at the subscriber location, where the communication pathway may transition to metallic cable once again, installation of the lawful intercept monitoring device at the target's ONT may be visible to the target and may thus alert the target that he or she is under surveillance, thereby defeating the purpose of the surveillance.

Therefore, there exists a need for systems and methods of lawfully intercepting and monitoring telephonic communications to and from a target receiving telephone service over a fiber optic network in a way that is transparent to the target and does not alert the target that he or she is under surveillance.

BRIEF DESCRIPTION OF THE SEVERAL VIEWS OF THE DRAWING(S)

DETAILED DESCRIPTION

Exemplary embodiments now will be described hereinafter with reference to the accompanying drawings, in which exemplary embodiments and examples are shown. Like numbers refer to like elements throughout.

Systems and methods for intercepting signals transmitted between a target served by a fiber optic network, such as a fiber to the premises (FTTP) network, and a subscriber (i.e., a subscriber served by the same network or a different network) are provided in accordance with various exemplary embodiments. An exemplary network includes a central office phone switch configured to convey communication signals to and from a subscriber, also referred to as a target in instances in which communications with the subscriber are to be intercepted. Target communications are assigned to an analog circuit at the central office, and a monitoring device installed along the analog circuit and situated proximate the central office is configured to intercept the communications, for example for surveillance by law enforcement. Advantageously, intercepting and monitoring of communications to and from the target are accomplished without notifying the target that he or she is under surveillance.

Figure 1:
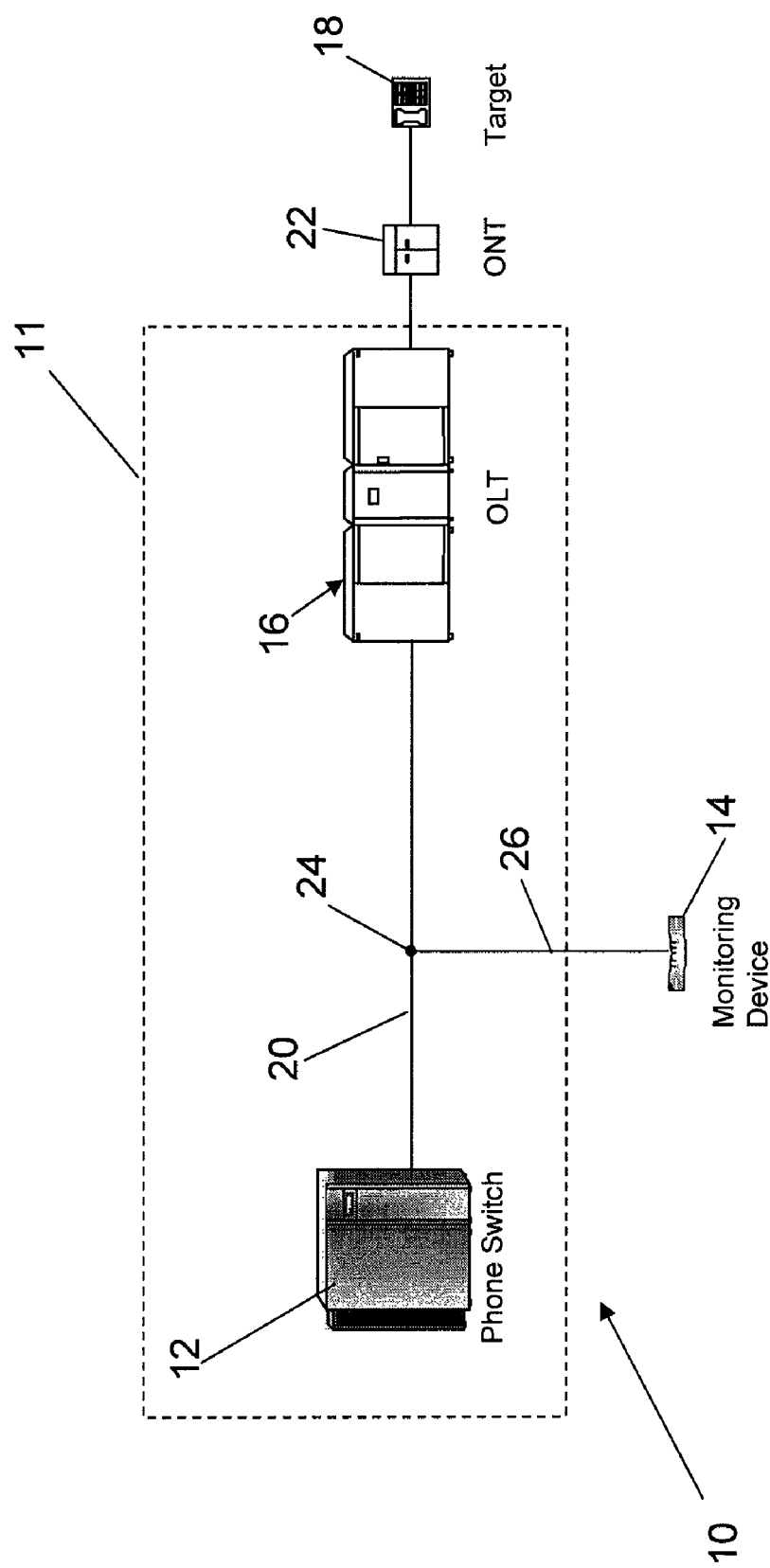
FIG. 1 is a schematic representation of one embodiment of the system for intercepting signals transmitted between a target served by a fiber optic network and a subscriber.

Referring to FIG. 1, embodiments of the system 10 comprise a phone switch 12 located at a central office 11, a monitoring device 14, and an optical line terminal (OLT) 16 located at the central office 11. The OLT 16 is configured to serve as a point of origination for a signal coming into or going out of the fiber optic network, and the phone switch 12 is configured to communicate with the fiber optic network via the OLT 16. An analog circuit 26, such as a circuit formed by conventional metallic cables, is disposed at a location between the phone switch and the optical line terminal such that the signal transmitted between a target 18 and a subscriber is propagated along the analog circuit 26, and the monitoring device 14 is configured to monitor the signal while the signal is propagating along the analog circuit 26.

Although the system 10 is configured to provide for the interception and monitoring of communication signals both transmitted from a subscriber to the target 18 as well as from the target 18 to a subscriber, communications involving the target as a recipient will be used in most of the examples that follow to facilitate a discussion of the embodiments. It is understood that such examples describing communication transmitted from the target to a subscriber in no way limit the application of these embodiments to communications transmitted from a subscriber to the target.

In communications involving the target as a recipient, the phone switch 12 is configured to receive a signal to be transmitted over a fiber optic network to the target 18. Although the signal is thereafter destined to be transmitted at least partially over a fiber optic network, the phone switch 12 typically receives the signal via conventional metallic cables. A communication pathway 20, also typically formed by metallic cables, connects the phone switch 12 to the target 18 through the OLT 16. The OLT 16 is configured to convert the signal to an optical signal for transmission over the fiber optic network. An optical network terminal (ONT) 22 may also be disposed between the OLT 16 and the target 18, typically at the target's premises, and may be configured to convert the signal transmitted via the fiber optic network from an optical signal to an analog signal to be transmitted over metallic cables to the telephone equipment of the target 18.

In order for the monitoring device 14 to monitor the communications of a particular target 18, the dynamic assignment of a communication pathway 20 at the phone switch 12 must be bypassed or overcome to allow for a dedicated analog circuit to be created between an access point 24, to which the monitoring device 14 is connected, and the target 18. The signal received at the central office 11 is assigned to an analog circuit 26 in different ways according to the type of equipment installed along the communication pathway 20. In one embodiment shown in FIG. 2, the assignment of the signal to a particular analog circuit 26 is made at the phone switch 12 and the OLT 16. More specifically, a signal received at the phone switch 12 to be transmitted to the target 18 would be assigned to the analog circuit 26, such as an analog POTS Line Equipment circuit, at the phone switch 16. Similarly, a signal received at the OLT 16 originating from the target 18 would be assigned to the analog circuit 26 at the OLT 16. In another embodiment, shown in FIG. 3, the assignment of the signal to a particular analog circuit 26 is made at the OLT 16. For example, a signal received at the phone switch 12 to be transmitted to the target 18 would be propagated to the OLT 16, where the assignment of the signal to the particular analog circuit 26 would be made.

Regardless of where the signal received at the central office 11 is assigned to an analog circuit 26, the monitoring device 14 is configured to monitor the signal while the signal is propagating along the analog circuit 26. The monitoring device 14 intercepts the signal via an access point 24, which may be provided by a cross box such as a cross connect box, a Subscriber Access Cabinet (SAC), a Subscriber Access Panel (SAP), or other similar device. In general, the monitoring device 14 may be disposed along and in communication with the analog circuit 26 at a location outside the central office 11 in accordance with statutes prohibiting the monitoring of communication within a central office. For example, the monitoring device 14 may be connected to a cross box located just outside the walls of the central office 11, but still proximate the central office 11 such that the target 18 is unaware that he or she is under surveillance.

Figure 2:
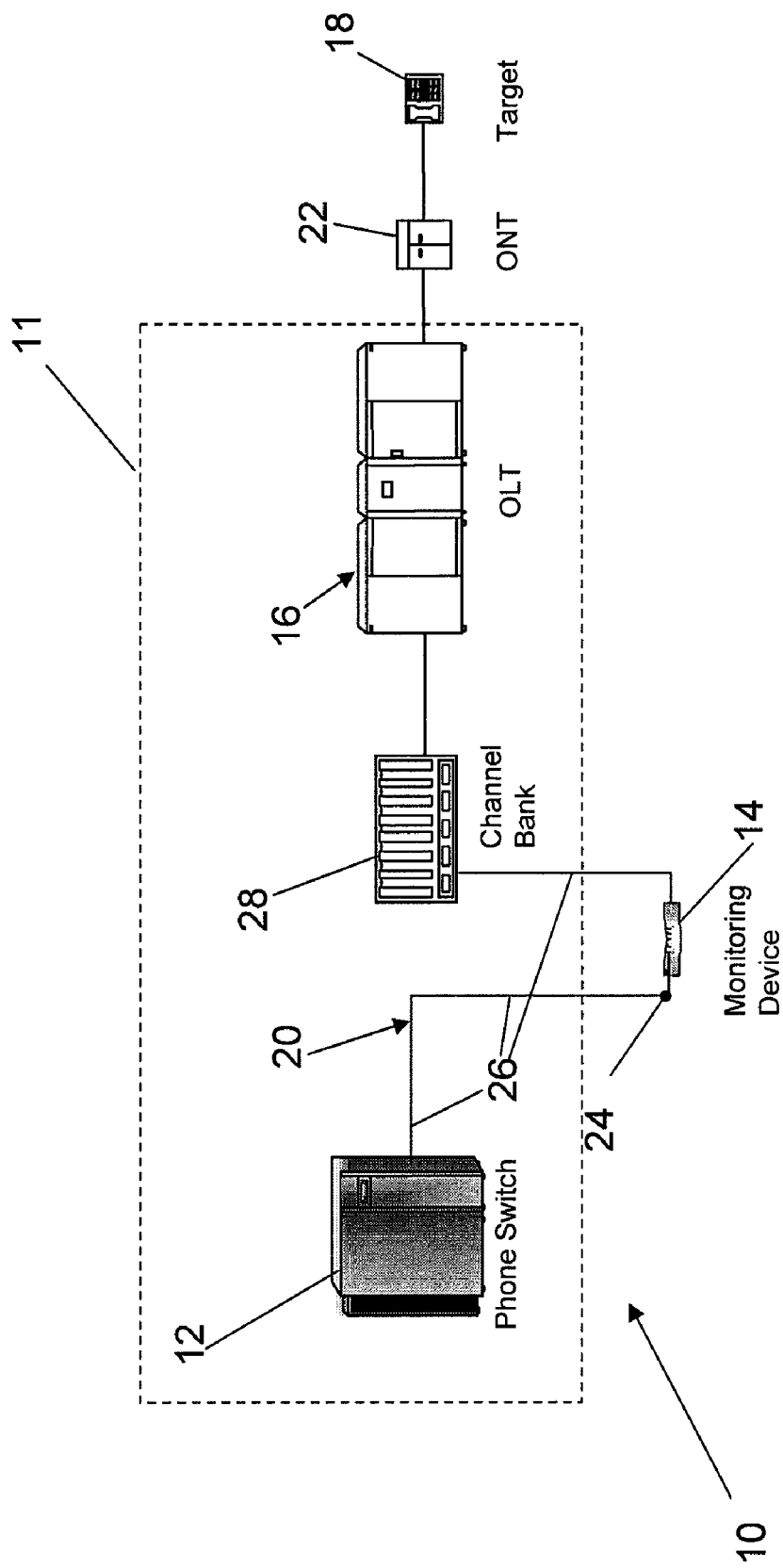
FIG. 2 is a schematic representation of one embodiment of the system for intercepting signals including a channel bank.

According to one embodiment of the system 10 illustrated in FIG. 2, such as a FTTP system with a TI only interface, the signal received by the phone switch 12 at the central office 11 may be assigned to an analog circuit 26 at the phone switch 12. The monitoring device 14 may be disposed along the analog circuit 26 at an access point 24 located between the phone switch 12 and the OLT 16. For example, the signal may be propagated along the analog circuit 26 from the phone switch 12, which may be a Class 5 Switch, to a cross box connecting a monitoring device 14 to the analog circuit 26. The monitoring device 14 may thus intercept and monitor the signal propagating along the analog circuit 26 via the connection at the cross box. The analog circuit 26 may then extend from the cross box, where the signal was monitored by the monitoring device 14, to terminate within a channel bank 28. The channel bank 28 may be configured to convert the POTS signal propagating along the analog circuit to a digital signal that is propagated to the OLT 16. The channel bank 28 may be, for example, a D4 type channel bank that is configured to convert the POTS signal to a T1/D1 signal. The D4 type channel bank may be configured to embed the analog signal into a T1 output of the channel bank. The channel bank 28 may further include a Foreign Exchange Office (FXO) type plug-in configured to terminate the analog circuit 26. The digital signal from the channel bank 28 may then propagate to the OLT 16, where the signal may be converted to an optical signal to be propagated to the target 18 via the optical fiber network, as previously mentioned. For example, internal provisioning within the OLT 16 may establish the analog POTS circuit connection from the channel bank 28 to the ONT 22 located at the target's premises. Similarly, signals received at the OLT 16 originating from the target 18 may be propagated to the analog circuit 26 for interception and monitoring.

Figure 3:
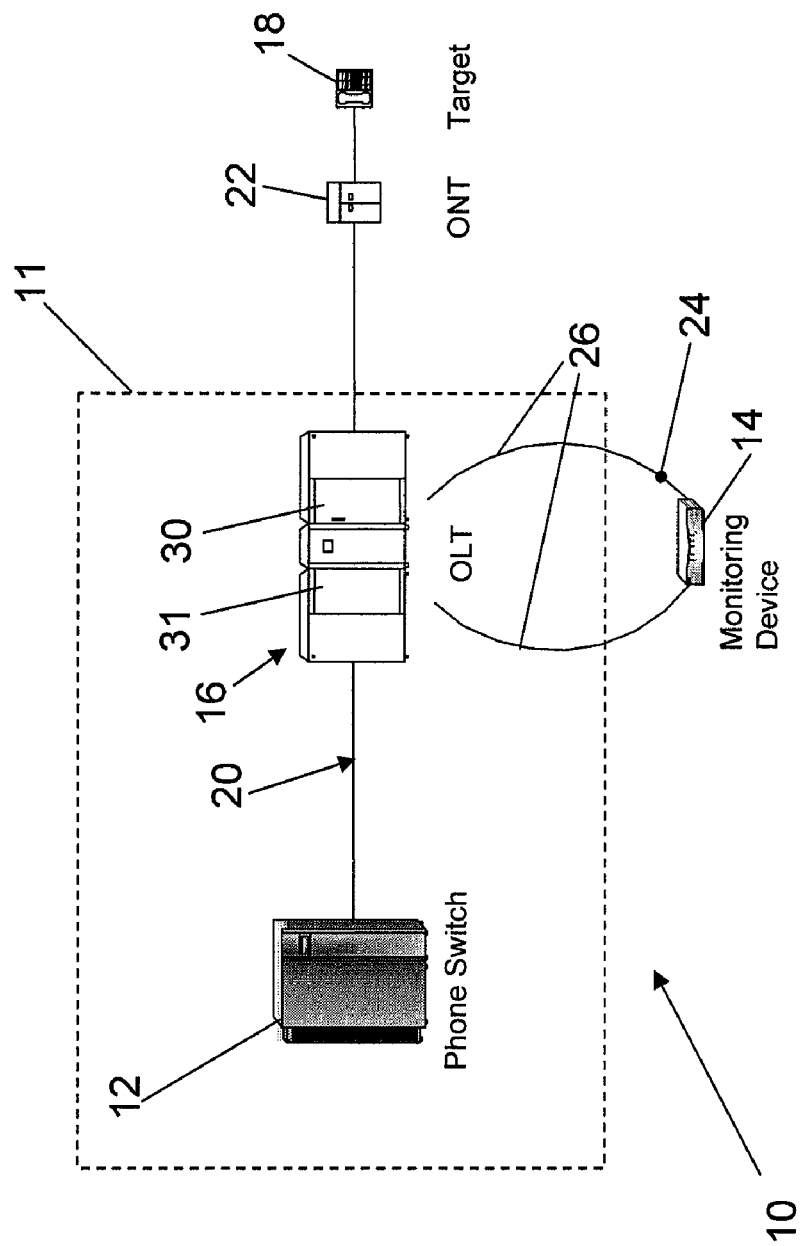
FIG. 3 is a schematic representation of one embodiment of the system for intercepting signals including an optical line terminal having first and second terminal interface cards.

In another embodiment, illustrated in FIG. 3, the signal received at the central office 11 is assigned to the analog circuit 26 at the OLT 16. Considering communications to be transmitted to the target 18 as a recipient, the signal received at the phone switch 12 is propagated along a dynamically assigned digital circuit, such as a T1 circuit, from the phone switch 12 to the OLT 16. The OLT 16, which may have a DS0 interface, for example, may have first and second terminal interface cards 30, 31 installed within the OLT 16. The target's signal may be isolated or "stripped out" within the OLT 16 and assigned to a particular analog circuit 26. The analog circuit 26 may then be routed from the first terminal interface card 30 to an access point 24, such as a cross box, where a connected monitoring device 14 may intercept the POTS analog signal and monitor the communication. The analog circuit 26 may then be routed from the monitoring device 14 back to the OLT 16, where it may terminate onto the second terminal interface card 31.

For example, a copper pair of conductors may extend from the first terminal interface card 30 to the cross box, where the signal may be intercepted and monitored by the monitoring device 14, and then extend back to the second terminal interface card 31 in the OLT 16. The first terminal interface card 30 may be, for example, a Remote Universal Voice Grade (RUVG) card or a Remote Plain Old Telephone Service (RPOTS) card. Similarly, the second terminal interface card 31 may be, for example, a Local Universal Voice Grade (LUVG) card or a Local Plain Old Telephone Service (LPOTS) card. RUVG and LUVG cards may be advantageous in some implementations relative to RPOTS and LPOTS cards because of the capability to option the transmit and receive levels of the circuit to allow for better monitoring of the communication. Alternatively, in systems including an ONT 22 at the target premises, the transmit and receive levels may also be optioned at the ONT 22. Optioning the transmit and receive levels adjusts the quality of service provided to a subscriber, making the audible level of conversation, echo, and other voice quality features appear normal. Generally, optioning the transmit and receive levels is only necessary for very long circuits, such as when a subscriber is located 20,000 feet from the central office. As previously mentioned, typically the access point 24 is located close to the central office 11, and as a result optioning the transmit and receive levels is generally not necessary for receiving quality transmissions at the monitoring device 14.

Once again, signals received at the OLT 16 originating from the target 18 may also be assigned to a particular analog circuit 26 in a similar manner. Thus communications originated by the target 18 may also be intercepted along the analog circuit 26.

Figure 4:
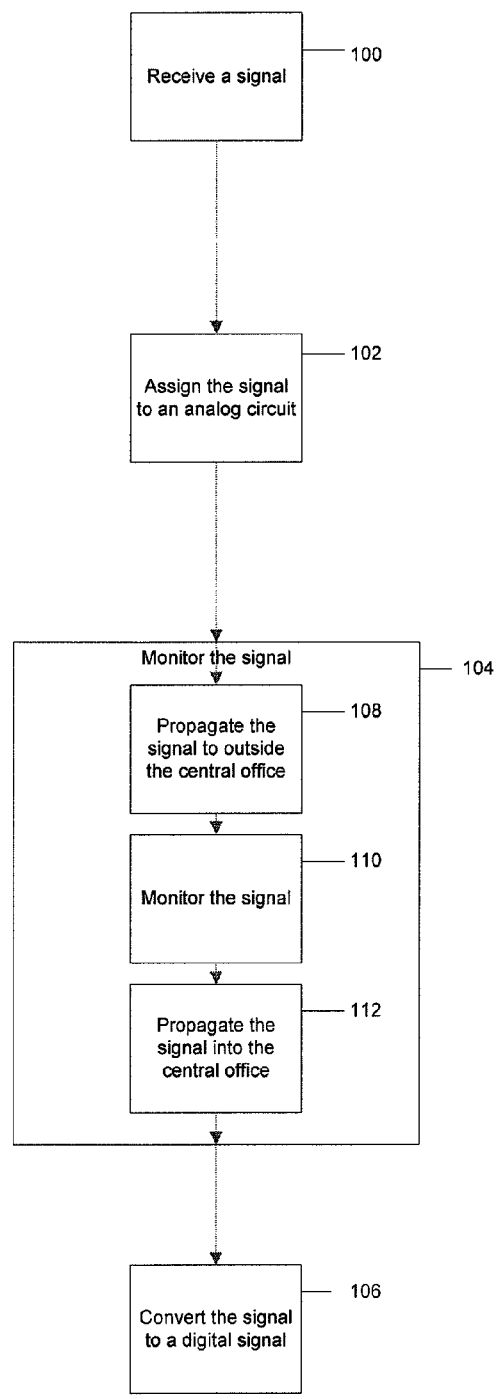
FIG. 4 is a flow chart illustrating embodiments of a method of intercepting signals between a target served by a fiber optic network and a subscriber.

A method is also provided for intercepting a signal to be transmitted between a target served by a fiber optic network and a subscriber without alerting the target that he or she is under surveillance. Referring to FIG. 4, a signal transmitted between a target and a subscriber of a fiber optic network is initially received at a central office. The signal is then assigned to an analog circuit, the signal is monitored while the signal propagates along the analog circuit, and then the signal that has been transmitted via the analog circuit is converted, after it is monitored, to a digital signal for transmission from the central office such as to the target over a fiber optic network. See FIG. 4, blocks 100-106.

In one embodiment, monitoring the signal may involve propagating the signal along the analog circuit from within the central office to a location outside the central office (for example, just outside the central office), monitoring the signal while the signal propagates along the analog circuit at the location outside the central office, and then propagating the signal along the analog circuit back into the central office after the signal has been monitored. See blocks 108-112. Propagating the signal to a location outside the central office for monitoring may be done, for example, to comply with laws prohibiting the monitoring of communications inside the central office.

Figure 5:
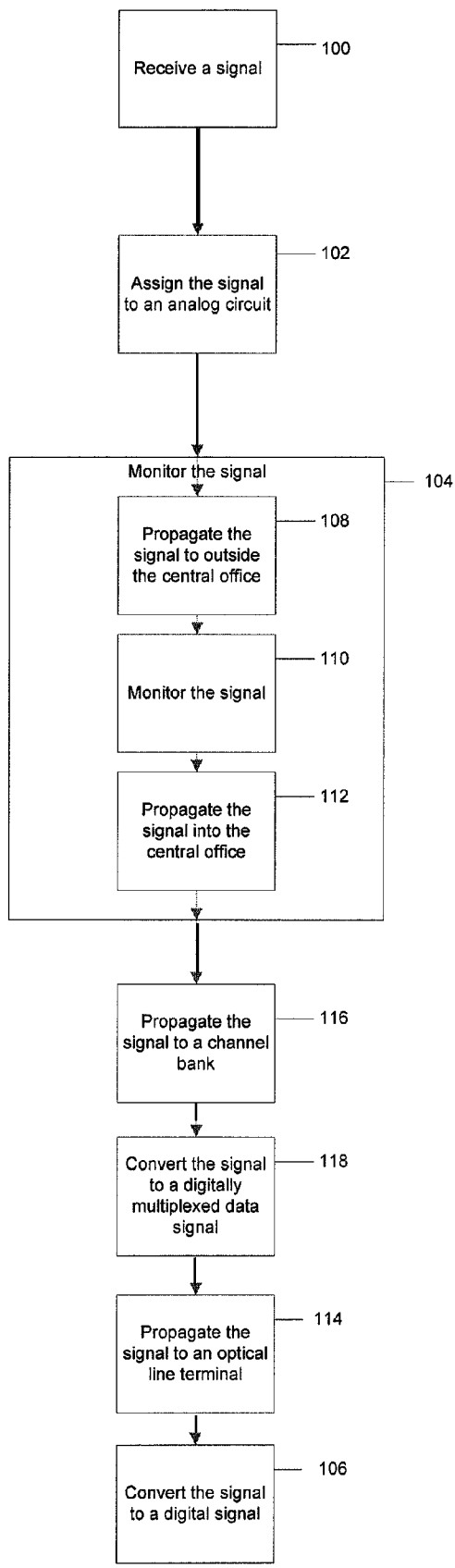
FIG. 5 is a flow chart illustrating one embodiment of a method of intercepting signals.

Depending on the type of equipment installed along the communication pathway between the central office and the target, the signal may be assigned to the analog circuit in different ways. Referring to FIG. 5 and considering communication to be received by the target, the signal may be propagated to an OLT after the signal has both been assigned to an analog circuit and monitored by the monitoring device. See block 114. Furthermore, the signal may be propagated to a channel bank after the signal has been assigned to an analog circuit and has been monitored, as previously described and illustrated in FIG. 2. For example, in a FTTP system with a T1 only interface, the POTS signal propagating along an analog circuit may be routed from a phone switch to a cross box with a connected monitoring device, then to a channel bank, such as a D4 type channel bank. The channel bank may further convert the POTS analog signal to a digitally multiplexed data signal prior to propagating the signal to the OLT. See blocks 116-118. Although not shown in FIG. 4, a communication signal originating with the target may likewise be propagated to a channel bank, after being propagated to an optical line terminal and assigned to the analog circuit and before being monitored, where the signal may be converted from a digitally multiplexed data signal to an analog signal. The signal may then be propagated to a phone switch for transmission to a subscriber recipient.

Figure 6:
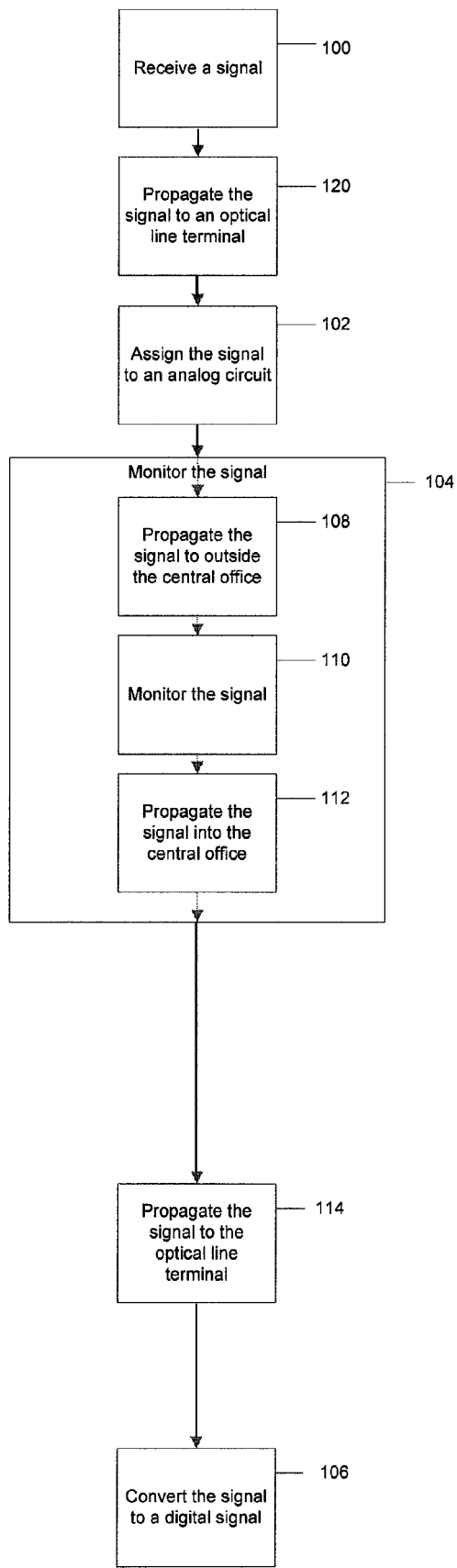
FIG. 6 is a flow chart illustrating another embodiment of a method of intercepting signals.

Alternatively, when the communications system includes an OLT having a DS0 interface, the signal received at the central office may be propagated to the OLT prior to assigning the signal to an analog circuit. See FIG. 6, block 120. In the case where the signal is propagated to the OLT before assignment to an analog circuit, the signal is isolated or "stripped out" within the OLT before it is routed to the monitoring device, then routed back to the OLT. If the target is a recipient, as shown in FIG. 6, the signal is converted to an optical signal and transmitted to the target, as previously described and illustrated in FIG. 3. If the target is an originator of the communication, the signal is transmitted to the subscriber recipient.

In the preceding specification, various embodiments of the claimed invention have been described. It will, however, be evident that various modifications and changes may be made thereunto without departing from the broader spirit and scope of the invention as set forth in the claims that follow. The specification and drawings are accordingly to be regarded in an illustrative rather than restrictive sense.

That which is claimed:

1. A system comprising:
   an optical line terminal, at a central office, to serve as a point of origination for a signal associated with a target, the signal coming into or going out of a fiber optic network;
   a phone switch, at the central office, to communicate with the fiber optic network via the optical line terminal;
   an analog circuit disposed at a location between the phone switch and the optical line terminal such that the signal, transmitted between the target served by the fiber optic network and a subscriber, is propagated along the analog circuit; and
   a monitoring device to monitor the signal while the signal is propagating along the analog circuit,
   where the optical line terminal comprises first and second terminal interface cards,
   where the analog circuit is routed, from the first terminal interface card, to the monitoring device, and to the second terminal interface card,
   where the first terminal interface card comprises one of a Remote Universal Voice Grade card or a Remote Plain Old Telephone Service card and is to convert the signal for transmission on the analog circuit, and
   where the second terminal interface card is to convert the signal for transmission from the analog circuit to the phone switch.

2. The system of claim 1 further comprising a cross box disposed along the analog circuit to connect the monitoring device to the analog circuit.

3. The system of claim 1, where the monitoring device is disposed outside of the central office.

4. The system of claim 3, where the monitoring device is proximate the central office.

5. A system comprising:
   an optical line terminal, at a central office, to serve as a point of origination for a signal associated with a target, the signal coming into or going out of a fiber optic network;
   a phone switch, at the central office, to communicate with the fiber optic network via the optical line terminal;
   an analog circuit disposed at a location between the phone switch and the optical line terminal such that the signal, transmitted between the target served by the fiber optic network and a subscriber, is propagated along the analog circuit; and
   a monitoring device to monitor the signal while the signal is propagating along the analog circuit,
   where the optical line terminal comprises first and second terminal interface cards, where the analog circuit is routed from the first terminal interface card to the monitoring device to the second terminal interface card, where the second terminal interface card comprises one of a Local Universal Voice Grade card or a Local Plain Old Telephone Service card, where one of the first terminal interface card or the second terminal interface card is to convert the signal for transmission on the analog circuit, and where another of the first terminal interface card or the second terminal interface card is to convert the signal for transmission from the analog circuit to the phone switch.

6. A method comprising:
receiving, by an optical line terminal and at a central office, a digital signal transmitted between a target served by a fiber optic network and a subscriber
converting, by one or more communication network devices, the digital signal to an analog signal;
assigning, by the one or more communication network devices, the analog signal to an analog circuit;
propagating, via the analog circuit, the analog signal to a channel bank;
directing, by the channel bank and via the analog circuit, the analog signal to a monitoring device;
monitoring, by the monitoring device, the analog signal propagated along the analog circuit; and
converting, by the one or more communication network devices and following monitoring of the signal, the analog signal to the digital signal for transmission from the central office.

7. The method of claim 6, where monitoring the analog signal comprises:
propagating the analog signal along the analog circuit to a location outside of the central office;
monitoring the analog signal while the analog signal propagates along the analog circuit outside of the central office; and
propagating the analog signal, along the analog circuit, back to the central office following the monitoring of the analog signal.

8. The method of claim 6 where converting the analog signal to the digital signal includes propagating the analog signal back to the optical line terminal after assigning the analog signal to the analog circuit and after monitoring the analog signal.

9. The method of claim 8 further comprising converting the analog signal to a digitally multiplexed data signal after monitoring the signal and prior to propagating the signal to the optical line terminal.

10. The method of claim 6, where the digital signal includes a digitally multiplexed data signal.

11. The method of claim 6 further comprising propagating the analog signal to a phone switch after assigning the analog signal to the analog circuit and after monitoring the analog signal.

12. The system of claim 5, where the monitoring device is disposed outside of the central office.

13. The system of claim 12, where the monitoring device is proximate the central office.

14. An apparatus comprising:
means for receiving, at a central office, a signal transmitted between a target served by a fiber optic network and a subscriber, where the signal is propagated on an optical line terminal;
means for assigning the signal to an analog circuit, in response to the signal being received;
means for propagating the signal to a channel bank, in response to the signal being propagated to the optical line terminal and the signal being assigned to the analog circuit;
means for monitoring the signal while the signal propagates along the analog circuit, in response to the signal being propagated to the channel bank and the signal being assigned to the analog circuit; and
means for converting the signal transmitted via the analog circuit to a digital signal for transmission from the central office.

* * * * *